(12) United States Patent
Gauselmann (10) Patent No.: US 8,602,862 B2
(45) Date of Patent: Dec. 10, 2013

(54) GAMING MACHINE DISPLAYING SPECIAL SYMBOL HAVING RANDOMLY SELECTED FUNCTIONS

(71) Applicant: Spielo International Austria GmbH, Lübbecke (DE)

(72) Inventor: Michael Gauselmann, Espelkamp (DE)

(73) Assignee: Spielo International Canada ULC, Moncton, New Brunswick (CA)

( * ) Notice: Subject to any disclaimer, the term of this patent is extended or adjusted under 35 U.S.C. 154(b) by 0 days.

(21) Appl. No.: 13/681,632

(22) Filed: Nov. 20, 2012

(65) Prior Publication Data

US 2013/0079106 A1   Mar. 28, 2013

Related U.S. Application Data

(63) Continuation of application No. 10/300,223, filed on Nov. 19, 2002, now abandoned.

(51) Int. Cl.
 *G07F 17/32* (2006.01)
(52) U.S. Cl.
 CPC .................................. *G07F 17/3265* (2013.01)
 USPC ............................................... 463/16; 463/31
(58) Field of Classification Search
 CPC ................... A63F 2300/6036; A63F 2300/40; A63F 230/402; A63F 2300/404; A63F 2300/406; A63F 2300/407; A63F 2300/408; G07F 17/3213; G07F 17/3293; G07F 17/3225; G07F 17/3265; G07F 17/3211; G07F 17/3223; G07F 17/3262; G07F 17/3267; G07F 17/3244
 USPC ........... 463/16, 20, 30–32, 40–42; 272/143 R
 See application file for complete search history.

(56) References Cited

U.S. PATENT DOCUMENTS

| | | | |
|---|---|---|---|
| 3,735,982 | A | 5/1973 | Gerfin |
| 6,089,977 | A | 7/2000 | Bennett |
| 6,165,070 | A | 12/2000 | Nolte et al. |
| 6,210,276 | B1 | 4/2001 | Mullins |
| 6,251,013 | B1 | 6/2001 | Bennett |
| 6,419,579 | B1 | 7/2002 | Bennett |
| 6,517,432 | B1 | 2/2003 | Jaffe |
| 6,533,658 | B1 | 3/2003 | Walker et al. |
| 6,551,187 | B1 | 4/2003 | Jaffe |
| 6,554,704 | B2 | 4/2003 | Nicastro |
| 6,561,900 | B1 | 5/2003 | Baerlocher et al. |
| 6,565,433 | B1 | 5/2003 | Baerlocher et al. |
| 6,572,473 | B1 | 6/2003 | Baerlocher |
| 6,585,264 | B2 | 7/2003 | Benett |
| 6,634,941 | B2 | 10/2003 | Olive |
| 6,648,758 | B2 | 11/2003 | Bennett et al. |
| 6,676,512 | B2 | 1/2004 | Fong et al. |
| 6,682,073 | B2 | 1/2004 | Bryant et al. |

(Continued)

*Primary Examiner* — David L Lewis
*Assistant Examiner* — Matthew D. Hoel
(74) *Attorney, Agent, or Firm* — Patent Law Group LLP; Brian D Ogonowsky (57) ABSTRACT

Disclosed herein is a game played on a gaming device that displays a randomly selected array of symbols, where the symbols across one or more pay lines are evaluated by circuitry to determine an award to be granted. One of the possible symbols is a special symbol that offers various special functions. The special symbol switches between two or more states, where each state provides a different function. The switching is stopped randomly or by the player, and the resulting function is carried out. In another embodiment, the special symbol allows symbols to be moved in the array or provides other functions.

8 Claims, 5 Drawing Sheets

(56) References Cited

U.S. PATENT DOCUMENTS

| | | |
|---|---|---|
| 6,780,109 B2 | 8/2004 | Kaminkow |
| 6,786,818 B1 | 9/2004 | Rothschild et al. |
| 6,805,349 B2 | 10/2004 | Baerlocher et al. |
| 6,855,054 B2 | 2/2005 | White et al. |
| 6,905,406 B2 | 6/2005 | Kaminkow et al. |
| 6,918,832 B2 | 7/2005 | Baerlocher et al. |
| 6,981,635 B1 | 1/2006 | Hughs-Baird et al. |
| 6,988,947 B2 | 1/2006 | Baerlocher et al. |
| 7,014,559 B1 | 3/2006 | Fong |
| 2002/0022509 A1 | 2/2002 | Nicastro et al. |
| 2003/0013517 A1 | 1/2003 | Bennett et al. |
| 2003/0022712 A1 | 1/2003 | Locke |
| 2003/0060276 A1 | 3/2003 | Walker et al. |
| 2003/0087688 A1 | 5/2003 | Kato |
| 2003/0125105 A1 | 7/2003 | Bennett |
| 2004/0048646 A1 | 3/2004 | Visocnik |

GAMING MACHINE DISPLAYING SPECIAL SYMBOL HAVING RANDOMLY SELECTED FUNCTIONS

CROSS REFERENCE TO RELATED APPLICATION

This application is a continuation of application Ser. No. 10/300,223, filed Nov. 19, 2002, entitled "Gaming Machine Displaying Special Symbol Having Randomly Selected Functions," which application is incorporated herein by reference in its entirety.

FIELD OF THE INVENTION

This invention relates to gaming devices, such as slot machines, and, in particular, to an additional feature performed in a game that grants awards to a player based upon symbol combinations.

BACKGROUND

Common slot machines randomly select and display an array of symbols on a video screen, then grant an award to a player based on the occurrence of certain symbol combinations across pay lines. Typically, the game ends after the symbols are displayed and the award, if any, is granted. Although these types of games are highly successful, it is advantageous to provide an additional feature to this basic game to make the game more interesting to a player. A more interesting game will generate increased revenue to the casino by its increased play.

SUMMARY

Disclosed herein is a game played on a gaming device that displays a randomly selected array of symbols, such as a video slot machine or a video monitor connected to a computer for on-line gaming. The symbols across one or more pay lines are evaluated by circuitry to determine an award to be granted. The present invention adds an additional feature to this conventional operation of a gaming machine. One embodiment of the present invention adds one or more special symbols that may be randomly selected by a pseudo-number generator. If this special symbol is selected and displayed, additional features in the game become available.

In one embodiment, once the array of symbols (including a special symbol) has been finally displayed, the special symbol may flash or switch between two colors or otherwise switch between any two states. In one embodiment, one of the states is associated with a positive result, and the other of the states provides no benefit to the player. The special symbol stops flashing or changing states based upon a pseudo-random number generator selecting one of the two states. If the final state is a positive result, the special symbol provides an additional feature such as:

1. The special symbol may turn into any symbol that will offer the highest award to the player;
2. The special symbol may become a wild card;
3. The special symbol may become a multiplier for any winning symbol combination in the pay line or in a different pay line;
4. The special symbol may trigger an additional feature, such as a bonus screen;
5. The special symbol may become a scatter symbol (i.e., provide an automatic grant of an award);
6. The special symbol may randomly move to one or more other positions in the array to effectively give the player additional chances to create a winning symbol combination, or the player may select the position of the special symbol;
7. The special symbol may cause other symbols on the same pay line or on a different pay line to change to give the player another chance of obtaining a winning symbol combination.

The above are just some examples of the possible features offered by the special symbol, and other features are envisioned.

In an alternate embodiment, the special symbol switches between more than two states, where one of the states is ultimately selected. For example, the special symbol may quickly change between a wild card, a multiplier, a scatter symbol, and a bonus trigger symbol. The sequence may repeat or be random.

In another embodiment, the special symbol successively jumps to various other positions within the symbol array, and the player attempts to touch the symbol when it is in the most advantageous position to obtain the highest win. The machine may also randomly stop the symbol.

In all embodiments, the changing of the special symbol state or position may be stopped either randomly by the machine or by the player touching the symbol using a touch screen. In one embodiment, the shifting occurs so fast that the player's timing of the touching of the screen is essentially random. When the symbol stops changing, the selected function is then carried out by the machine's microprocessor.

Other examples of features arising from the display of the special symbol are described herein.

BRIEF DESCRIPTION OF THE DRAWINGS

FIGS. 4-11B illustrate the effects on symbols in a pay line when a special symbol occurs along the pay line.

DETAILED DESCRIPTION

Although the invention can typically be implemented by installing a software program in most types of modern video gaming machines, one particular gaming machine platform will be described in detail.

Figure 1:
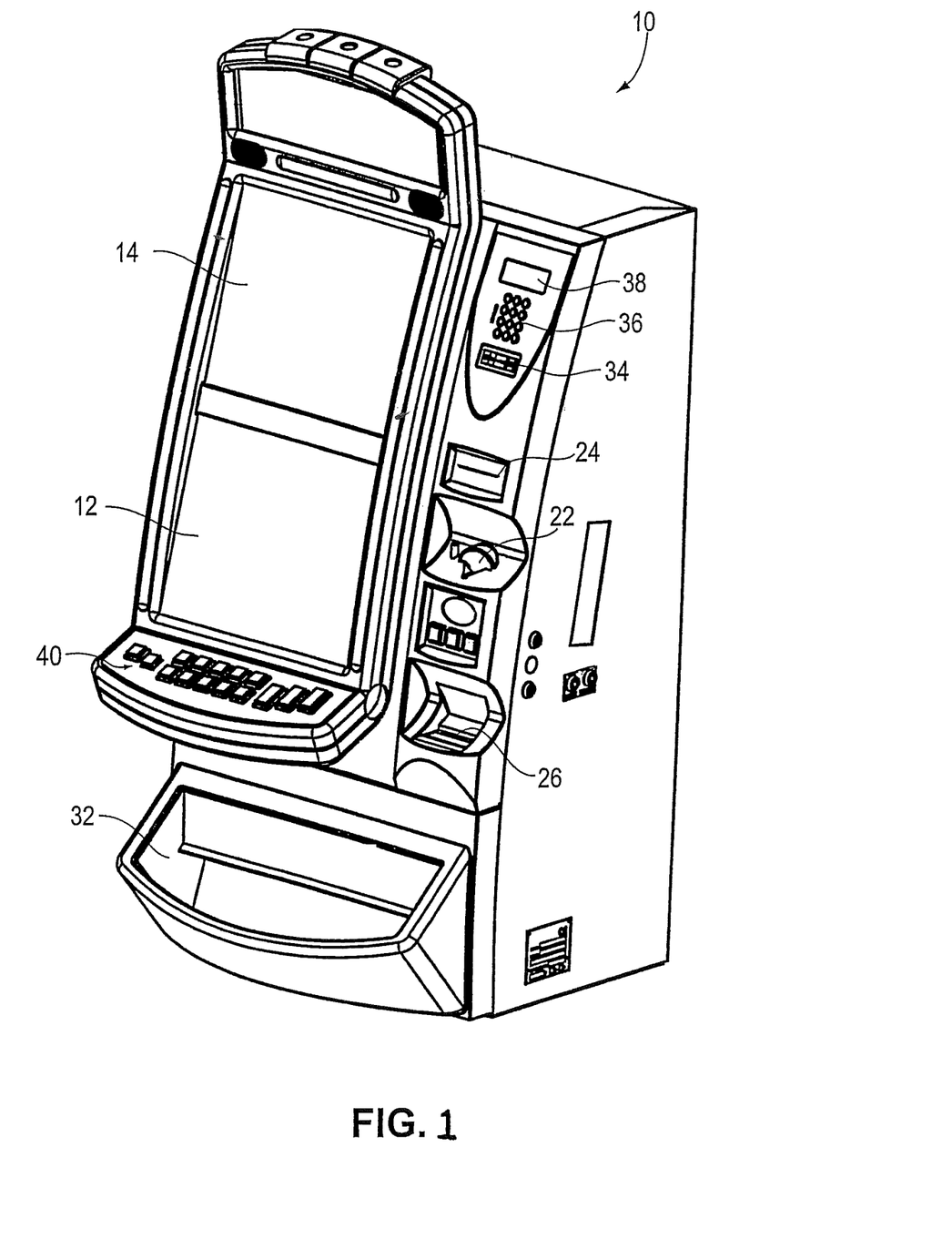
FIG. 1 illustrates a gaming machine that may display a game in accordance with the present invention.

FIG. 1 is a perspective view of a gaming machine 10 that incorporates the present invention. Machine 10 includes a display 12 that may be a thin film transistor (TFT) display, a liquid crystal display (LCD), a cathode ray tube (CRT), or any other type of display. A second display 14 provides game data or other information in addition to display 12. Display 14 may provide static information, such as an advertisement for the game, the rules of the game, pay tables, pay lines, or other information, or may even display the game itself along with display 12. Alternatively, the area for display 14 may be a display glass for conveying information about the game.

A coin slot 22 accepts coins or tokens in one or more denominations to generate credits within machine 10 for playing games. An input slot 24 for an optical reader and printer receives machine readable printed tickets and outputs printed tickets for use in cashless gaming. A bill acceptor 26 accepts various denominations of banknotes.

A coin tray 32 receives coins or tokens from a hopper upon a win or upon the player cashing out.

A card reader slot 34 accepts any of various types of cards, such as smart cards, magnetic strip cards, or other types of cards conveying machine readable information. The card reader reads the inserted card for player and credit information for cashless gaming The card reader may also include an optical reader and printer for reading and printing coded barcodes and other information on a paper ticket.

A keypad 36 accepts player input, such as a personal identification number (PIN) or any other player information. A display 38 above keypad 36 displays a menu for instructions and other information and provides visual feedback of the keys pressed.

Player control buttons 40 include any buttons needed for the play of the particular game or games offered by machine 10 including, for example, a bet button, a repeat bet button, a spin reels button, a maximum bet button, a cash-out button, a display pay lines button, a display payout tables button, select icon buttons, and any other suitable button. Buttons 40 may be replaced by a touch screen with virtual buttons.

Figure 2:
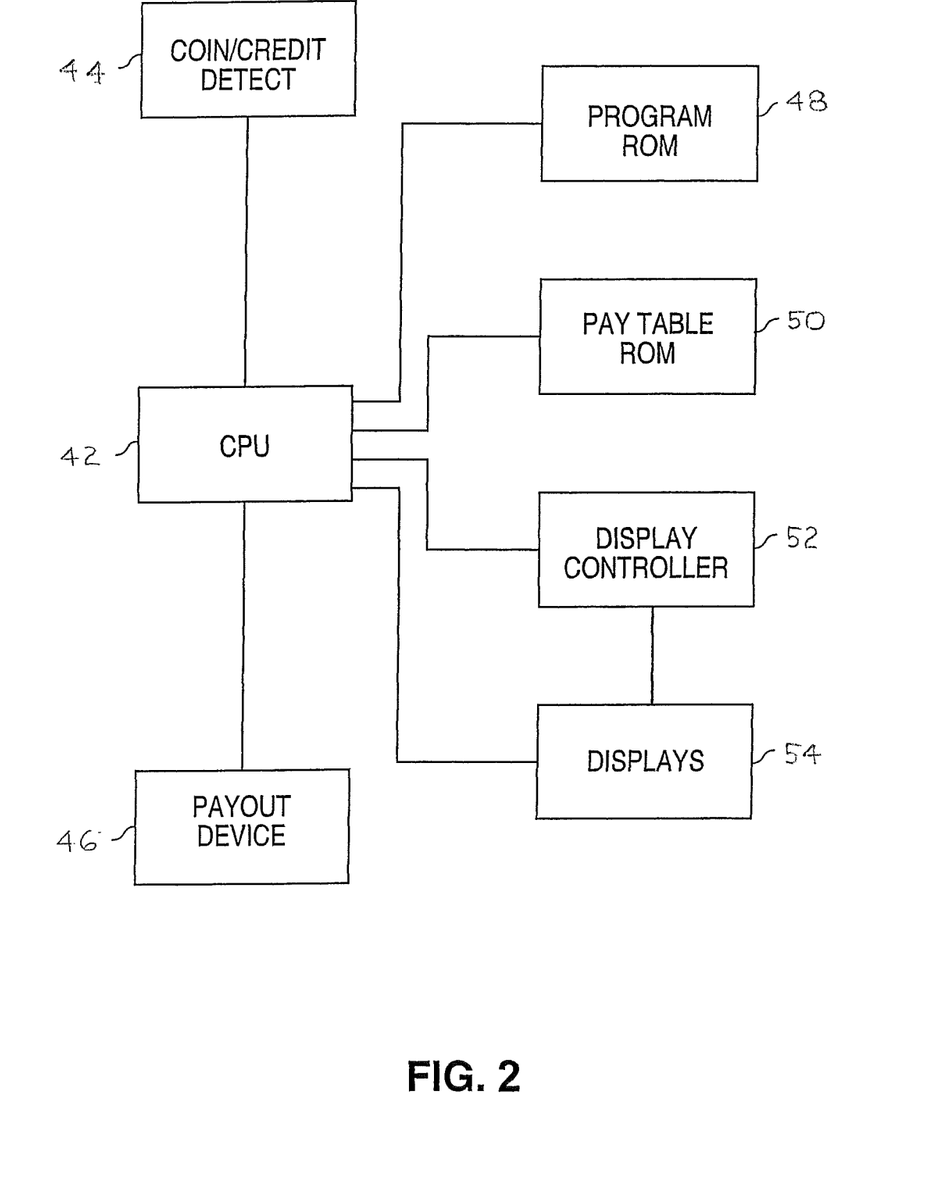
FIG. 2 is a block diagram of key components in the gaming machine of FIG. 1.

FIG. 2 illustrates basic circuit blocks in a suitable gaming device. A control unit (CPU 42) runs a gaming program stored in a program ROM 48. The program ROM 48 may include a pseudo-random number generator program for selecting symbols and for making other random selections. A coin/credit detector 44 enables the CPU 42 to initiate a next game. A pay table ROM 50 detects the outcome of the game and identifies awards to be paid to the player. A payout device 46 pays out an award to the player in the form of coins upon termination of the game or upon the player cashing out. The payout may also be in the form of a coded paper ticket, credits on a smart card or magnetic strip card, or in any other form. A display controller 52 receives commands from the CPU 42 and generates signals for the various displays 54. If a display 54 is a touch screen, player commands may be input through the display screen into the CPU 42.

Figure 3:
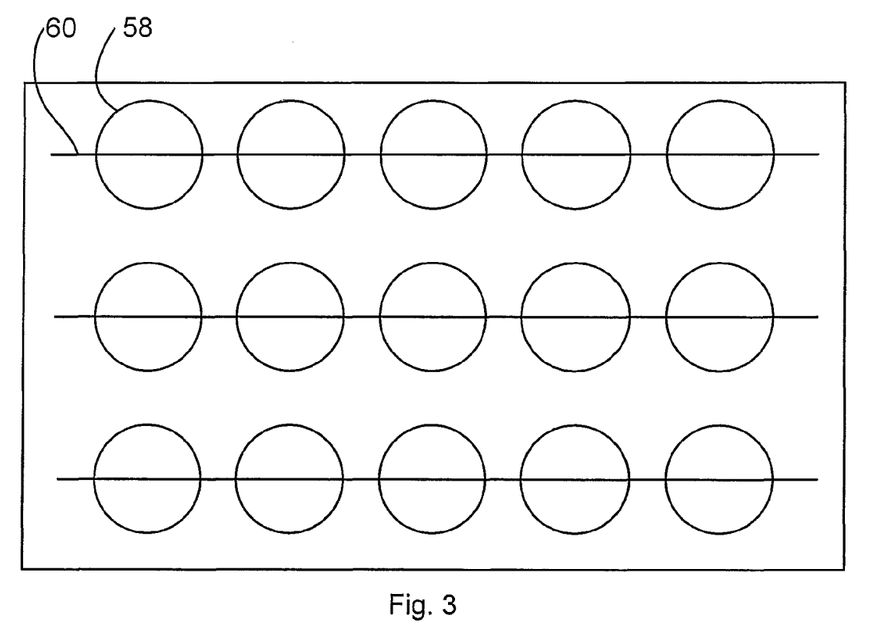
FIG. 3 illustrates a video screen displaying a 3x5 array of symbols and three pay lines.

The invention may be carried out on any form of video game that determines an award based upon combinations of symbols across one or more pay lines. There may be only a single row array of three or more symbols, an array of 3×3 symbols, an array of 5×3 symbols, or any other arrangement of symbols. A 5×3 array of symbols will be used as an example, and such an array is shown in FIG. 3, where each symbol position 58 is identified with a circle. Any pattern of pay lines (such as pay line 60) through the array may be utilized, such as straight or zig-zag pay lines. Three pay lines are illustrated in FIG. 3 for simplicity.

Standard symbols include fruit symbols and symbols associated with the theme of the particular slot machine. The particular icons used are not important. Typically, a code associated with each possible symbol is stored in memory, and a pseudo-random number generator selects the symbol to be displayed on the video screen. For amusement, each vertical column of symbols is scrolled to emulate a motor-driven reel, and each of the virtual reels is typically stopped in sequence after a few seconds to reveal the final 5×3 array of symbols. In the present invention, at least one of the possible symbols to be displayed is a special symbol that may assume any appearance. For simplicity, this special symbol will be represented by abbreviated words or a symbol within a circle.

Figure 4:
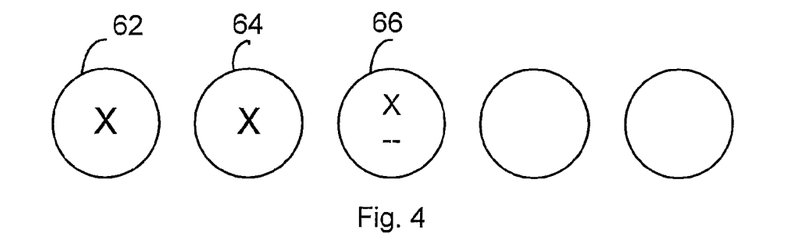

FIG. 4 illustrates one horizontal line across the symbol array of FIG. 3, where it is assumed that three consecutive X symbols starting from the leftmost reel generates a certain award for the player. After the initial part of the game, two X symbols 62, 64 are displayed in the first and second positions, and a special symbol 66 is displayed in the third position. The fourth and fifth positions are not relevant to this discussion. The special symbol 66 then visually switches between two states, such as by flashing or switching between two colors or images, where one of the states results in a winning symbol being displayed in that third position, and the other of the states not resulting in a winning symbol being displayed. (The two states of special symbol 66 are visually indicated by an "X" and a dash for simplicity.) The winning symbol may be a wild card. Hence, when the positive state of the special symbol 66 is finally displayed after a period of time (e.g., the special symbol 66 stops flashing), the symbol X will appear in the third position, and the player wins the associated award for three X's.

In one embodiment, a pseudo-random number generator within the game software or firmware selects which of the two states will be the final state of symbol 66. In another embodiment, a touch screen is used as the main display screen 12, and the player attempts to touch symbol 66 at the moment that symbol 66 is at a positive state to stop symbol 66 from further changing states.

Figure 5:
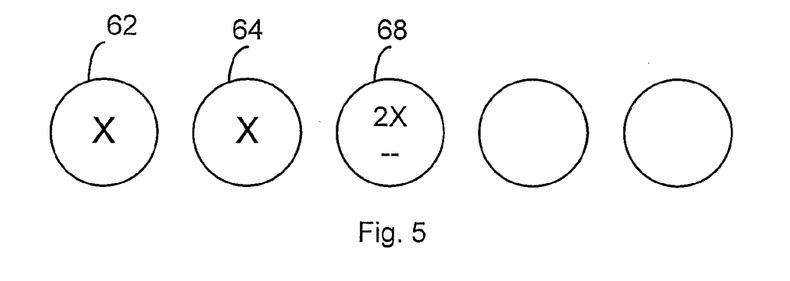

FIG. 5 illustrates a single row of symbols, where a special symbol 68 appears having one of two states. The states of symbol 68 are rapidly switched after all the symbols have been initially displayed. In the example of FIG. 5, the special symbol 68 switches between a losing state (represented by a dash) and an award multiplication state (represented by 2×). A losing state is considered a state that does not help the player. After a period of time, the symbol 68 assumes a final symbol state. Accordingly, the pay line incorporating the symbol 68 as a 2× multiplier causes any award granted in that pay line to be multiplied by two. Further, the game may be programmed such that any award generated in the entire symbol array is multiplied by the special symbol multiplier. Additionally, the special symbol 68 may act as a wild card to represent any symbol needed for a win as well as multiplying the award for the symbol combination incorporating the wild card.

In other embodiments, the special symbol switches between two or more states, where none of the states is a losing state and where each state provides a different positive feature.

Figure 6:
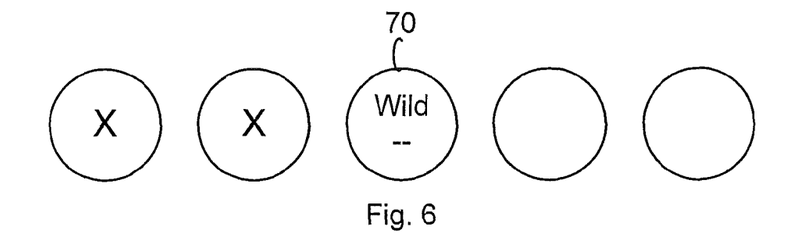

FIG. 6 illustrates a horizontal row of symbols, where the special symbol 70 switches between a wild card and a losing symbol (or any other symbol), and the final state of symbol 70 is selected as described with respect to FIG. 4.

Figure 7A:
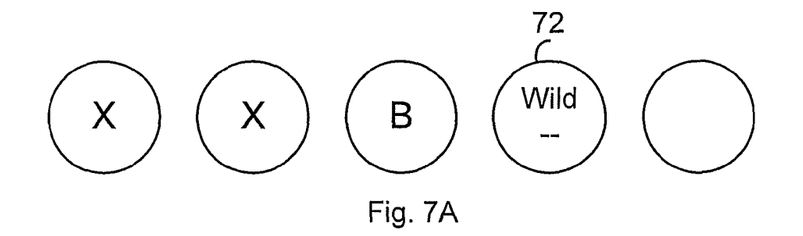
Figure 7B:
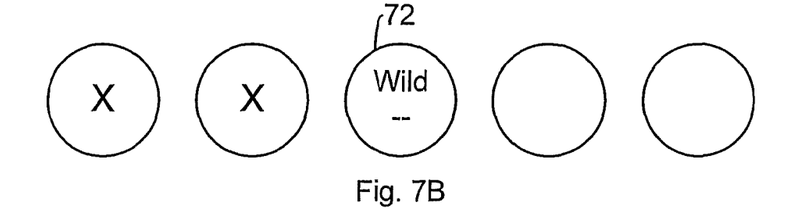

In FIG. 7A, five symbols across a horizontal pay line are shown, where the symbol B is between the X in the second position and a special symbol 72. When the special symbol 72 assumes a positive state, after switching between two or more states, the position of the special symbol changes either along the same pay line to the right or to the left, whichever provides the highest win, or to another position in the symbol array so as to give the player a winning combination of symbols. FIG. 7B illustrates the example where the special symbol 72 has replaced symbol B in order to provide the player an award for three X's. The special symbol 72 may change to an X or may be a wild card.

In a variation of this embodiment, after the special symbol 72 has moved positions, the special symbol switches between the two states and ultimately assumes a final state. The feature provided by the final state then takes effect in the symbol's new position. The symbol can then keep moving around the array automatically until a winning combination results or the special symbol becomes a losing symbol.

Figure 8:
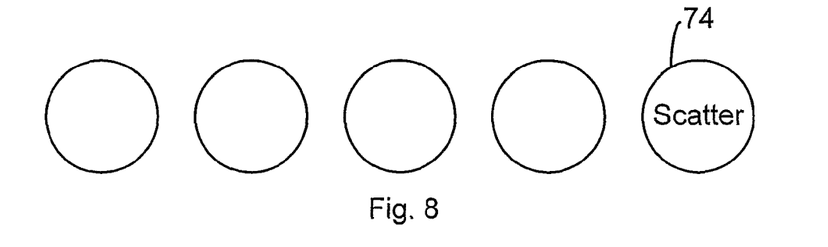

FIG. 8 illustrates the special symbol 74 as a scatter symbol that rapidly assumes two or more states. If a scatter symbol 74 occurs anywhere in the array, and if the scatter symbol assumes the positive state after a random selection by the game or a selection by the player, an award is granted. Additional scatter symbols multiply the award.

As with the other embodiments, any conventional winning symbol combinations (not containing a special symbol) along activated pay lines also grant an award to the player.

Figure 9:
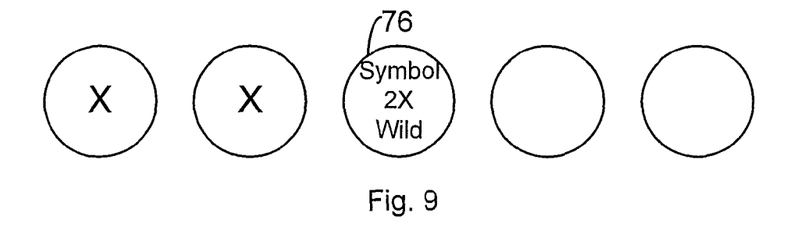

FIG. 9 illustrates a special symbol 76 that switches between more than two states, where the states may include a multiplier state, a wild card state, a scatter state, a higher value symbol state, a losing state, or any other feature. Whatever the final state of symbol 76, that function is then performed.

Figure 10:
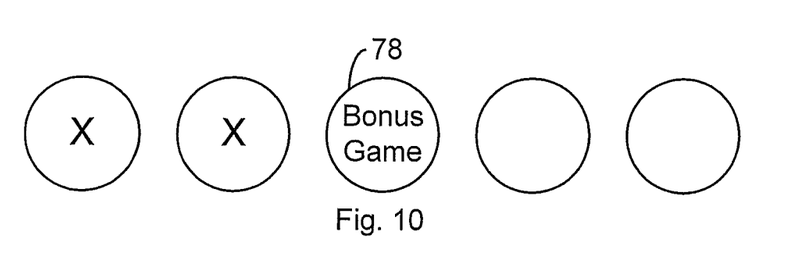

In FIG. 10, the special symbol 78 includes as one of its states a trigger for an additional feature such as a bonus game. The selection of that particular state may also cause the symbol 78 to assume a wild card symbol or any other type of positive symbol.

Figure 11A:
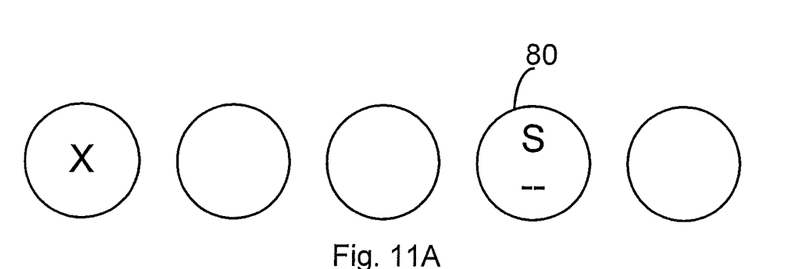
Figure 11B:
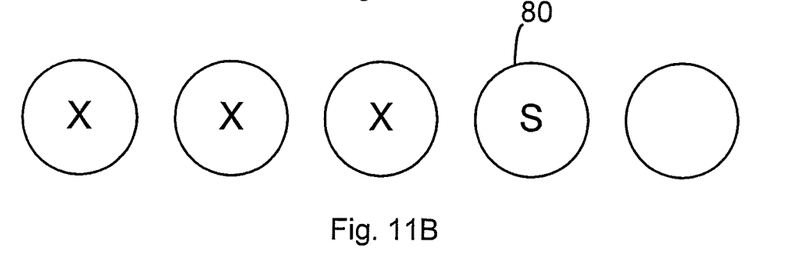

In FIG. 11A, an initial display along a horizontal row of symbols has an X symbol in the first symbol position and a special symbol 80 in the fourth position. The symbols in the other positions along the horizontal are losing symbols. The existence of the special symbol causes all symbols to the left of the special symbol to assume the state of the leftmost symbol, in this case an X symbol, as shown in FIG. 11B. Accordingly, the player now has three X's, which grants an award to the player. The special symbol 80 itself may act as a wild card or assume the state of the leftmost symbol, giving the player an award for four X's. This same technique can be used to fill symbols along a column, or to change symbols to the right of the special symbol, or fill up the entire row with a particular symbol, such as the highest symbol on the pay line or any other symbol.

For the special symbols described herein, there are at least two states that provide different features. The probability of any one state occurring may be weighted in the random number generator to change the likelihood of that state being selected.

In another embodiment, the existence of the special symbol gives the player the option of whether to take any award granted in the initial game or to play again, for free, but forfeiting any award in the initial game. In one embodiment, the player may get two free games. The special symbol may change states or simply provide the free game feature.

In a variation of that game, the special symbol may be or becomes a first symbol during the initial game and, if the player elects, the special symbol becomes another selected symbol. The selection of the new symbol may be random or preselected by the player. In one embodiment, the player can obtain up to three different symbols, thus providing the player three chances to win. If the player elects to cause the special symbol to randomly become another symbol by, for example, touching the symbol on a touch screen, any award from the initial display is then substituted by an award, if any, from the subsequent display incorporating the changed symbol. The symbols can be with or without replacement. "Without replacement" means that, once the special symbol assumes a particular symbol, that particular symbol cannot be again selected for the special symbol. "With replacement" means that the particular symbol can be again selected for the special symbol.

In another embodiment, the special symbol appears somewhere on the screen in the initial display, then disappears, and then appears again in another position and so on. The player has to "catch" the symbol by touching the symbol in the array. During the process, the symbol may morph into any symbol, including a wild card symbol, a scatter symbol, etc. If the player catches the symbol, the existing state of the symbol is applied to that particular symbol position. In one embodiment, the player has the option to not keep that particular symbol and again try to catch the symbol. This may be performed a number of times, such as three times. In one embodiment, the gaming machine itself stops the symbol randomly. In the case of the symbol jumping to other positions on the screen, the symbol need not have multiple states but may simply be a wild card symbol.

In another embodiment, the special symbol appearing in the array of symbols allows the player to choose one symbol displayed on the screen and "drag" that symbol to the position where the special symbol is. This may be performed using a touch screen or a cursor. The gaming machine may be equipped with a trackball, a joystick, or other type of controller. In a variation of that embodiment, the special symbol can assume a particular state, such as a wild card or another symbol, and the player may choose to move the special symbol to a new position on the screen to obtain the highest award. The special symbol may have any of the functions described herein. The movement of the special symbol may instead be performed automatically and randomly by the gaming machine. Accordingly, the player will have two chances to win in a single game.

Any combination of features of the special symbols described herein may be made. The available features of a special symbol may change from game to game.

While particular embodiments of the present invention have been shown and described, it will be obvious to those skilled in the art that changes and modifications may be made without departing from this invention in its broader aspects and, therefore, the appended claims are to encompass within their scope all such changes and modifications as fall within the true spirit and scope of this invention.

What is claimed is:

1. A method performed by a gaming device conducting a single game resulting from a single spin of virtual reels, the method comprising:

displaying an array of randomly selected symbols on a display screen in a game after a spin of virtual reels, certain combinations of symbols along pay lines providing an award for a player, at least one of the symbols displayed being a special symbol, the array comprising an N column by M row matrix of symbols;

prior to any subsequent spin of the reels, and as the array of symbols remains the same during the game, automatically changing a position of the special symbol in the array one or more times to provide the player additional opportunities to win, the changing positions of the special symbol being selected by the gaming device; and allowing the player to attempt to touch the special symbol in the array, using a touch screen, as the special symbol automatically changes its position as selected by the gaming device, wherein, if the player touches the special symbol while the special symbol is in a position automatically selected by the gaming device, the special symbol remains in that position in the array and performs a function associated with the special symbol, the special symbol in combination with other symbols in the array, as the array of symbols remains the same during the game, determining an award based on relative positions of the special symbol and the other symbols, an award amount being based on, at least, a number of symbols of the same type in the combination.

2. The method of claim 1 wherein the function changes depending on certain factors.

3. The method of claim 2 wherein the factors comprise a random selection of the function of the special symbol by the gaming machine.

4. The method of claim 1 wherein the function is dependent upon a changing state of the special symbol at the time that the player touches the special symbol in the array on the touch screen.

5. The method of claim 1 further comprising providing the player an election to again allow the special symbol to change positions in an attempt to increase any award to the player.

6. The method of claim 1 wherein changing a position of the special symbol in the array comprises the gaming device automatically moving the special symbol, the method further comprising randomly stopping the symbol from moving by the gaming device.

7. The method of claim 1 wherein the special symbol provides a wild card function.

8. The method of claim 1 wherein the gaming device comprises a computer performing on-line gaming.

\* \* \* \* \*